US012749166B2

(12) United States Patent
Herbon

(10) Patent No.: US 12,749,166 B2
(45) Date of Patent: Sep. 29, 2026

(54) COMPUTER-IMPLEMENTED METHOD FOR CORRECTING AT LEAST ONE CORRESPONDENCE FROM SENSOR RECORDINGS CREATED IN ROWS AND/OR COLUMNS, CONTROL DEVICE FOR CARRYING OUT SUCH A METHOD AND MOTOR VEHICLE WITH SUCH A CONTROL DEVICE

(71) Applicants: Robert Bosch GmbH, Stuttgart (DE); CARIAD SE, Wolfsburg (DE)

(72) Inventor: Christopher Herbon, Stuttgart (DE)

(73) Assignees: Robert Bosch GmbH, Stuttgart (DE); Cariad SE, Wolfsburg (DE)

( * ) Notice: Subject to any disclaimer, the term of this patent is extended or adjusted under 35 U.S.C. 154(b) by 24 days.

(21) Appl. No.: 19/058,625

(22) Filed: Feb. 20, 2025

(65) Prior Publication Data

US 2025/0265690 A1 Aug. 21, 2025

(30) Foreign Application Priority Data

Feb. 21, 2024 (DE) .................... 10 2024 104 890.5

(51) Int. Cl.
*G06T 5/80* (2024.01)
*G06T 3/60* (2024.01)
(Continued)

(52) U.S. Cl.
CPC .................. *G06T 5/80* (2024.01); *G06T 3/60* (2013.01); *G06T 7/0002* (2013.01); *G06T 7/60* (2013.01);
(Continued)

(58) Field of Classification Search
CPC ........... G06T 5/80; G06T 3/60; G06T 7/0002; G06T 7/60; G06T 2207/30168; G06T 2207/30252; H04N 25/531; H04N 25/62
See application file for complete search history.

(56) References Cited

U.S. PATENT DOCUMENTS 8,300,887 B2 * 10/2012 Nishigaki .............. G06T 7/246 348/94
2010/0172546 A1 * 7/2010 Sharp ....................... G06T 7/70 382/106
2020/0003574 A1 * 1/2020 Lugez ....................... G06T 7/55

OTHER PUBLICATIONS

Forssen et al., Rectifying Rolling Shutter Video from Hand-Held Devices, Proceedings/2010 IEEE Computer Society Conference on Computer Vision and Pattern Recognition, Jun. 2010 (8 pages).
(Continued)

*Primary Examiner* — Abdelaaziz Tissire
(74) *Attorney, Agent, or Firm* — Maginot, Moore & Beck LLP

(57) ABSTRACT

A computer-implemented method corrects at least one correspondence of row-wise and/or column-wise sensor recordings of a sensor, in particular of a rolling shutter sensor. The method includes assigning a projection center to the sensor, at a first instant of time, a first sensor recording is started by the sensor, and at a second instant of time, temporally subsequent to the first instant of time, a second sensor recording is started by the sensor. In the method, a first image of at least one object of the real world is determined on an image plane of the sensor in the first sensor recording, and a second image, associated with the first image, of the at least one object on the image plane of the sensor is determined in the second sensor recording. The at least one correspondence is determined as a vector from the first image to the second image.

15 Claims, 4 Drawing Sheets

(51) Int. Cl.
*G06T 7/00* (2017.01)
*G06T 7/60* (2017.01)

(52) U.S. Cl.
CPC ............... *G06T 2207/30168* (2013.01); *G06T 2207/30252* (2013.01)

(56) References Cited

OTHER PUBLICATIONS

Shoemake, Ken, Animating Rotation with Quaternion Curves, Proceedings of the 12th Annual Conference on Computer Graphics and Interactive Techniques, Jul. 1985, vol. 19, No. 3 (10 pages).
Liang et al., Analysis and Compensation of Rolling Shutter Effect, Image Processing, IEEE Transactions, 17:1323-1330, 2008 (9 pages).
Bradley et al., Synchronization and Rolling Shutter Compensation for Consumer Video Camera Arrays, 2009 IEEE Computer Society Conference on Computer Vision and Pattern Recognition Workshops, 2009 (8 pages).
Purkait et al., Rolling Shutter Correction in Manhattan World, Proceedings of the IEEE International Conference on Computer Vision, 2017 (9 pages).
Hedborg et al., Rolling Shutter Bundle Adjustment, 2012 IEEE Conference on Computer Vision and Pattern Recognition, 2012 (8 pages).

* cited by examiner

COMPUTER-IMPLEMENTED METHOD FOR CORRECTING AT LEAST ONE CORRESPONDENCE FROM SENSOR RECORDINGS CREATED IN ROWS AND/OR COLUMNS, CONTROL DEVICE FOR CARRYING OUT SUCH A METHOD AND MOTOR VEHICLE WITH SUCH A CONTROL DEVICE

This application claims priority under 35 U.S.C. § 119 to patent application no. DE 10 2024 104 890.5, filed on Feb. 21, 2024 in Germany, the disclosure of which is incorporated herein by reference in its entirety.

The disclosure relates to a computer-implemented method for the correction of at least one correspondence of row- and/or column-wise sensor recordings of a sensor, in particular a rolling shutter sensor.

The disclosure also relates to a control unit for carrying out such a method and a motor vehicle with a sensor, in particular a rolling shutter sensor, and such a control unit.

BACKGROUND

In particular, the use of a sensor with row-by-row exposure—a rolling shutter sensor—generally results in a distortion of the sensor recording—also referred to below as the rolling shutter effect. The distortion occurs because the image rows are not exposed simultaneously but one after the other.

These distortions can be digitally undone. Typically, assumptions about the movement of the sensor and the geometry of the scene are necessary for this. In particular, information about the geometry of the scene—especially depth information—is difficult to determine, since this already requires an estimation of the movement and a triangulation of the world points, which in turn are influenced by the row-by-row exposure.

This makes it clear that the correction of the distortions is needed to determine the depth of an object. However, the depth of the object is needed to correct the distortions.

There are methods that simultaneously estimate the depth and the rolling shutter effect. However, these methods are computationally intensive and therefore not suitable for real-time use on embedded hardware.

In existing image processing systems, a rolling shutter effect is usually neglected. For individual special problems, the rolling shutter effect is explicitly corrected separately using a world model. However, the correction using the world model cannot be generalized.

From Analysis and compensation of rolling shutter effect by Chia-Kai Liang et al. in Image Processing, IEEE Transactions on, 17:1323-1330, 09.2008, a method for correcting a sensor recording is known that is based on a planar motion model. This assumes that all points in the real world lie on a plane, for example on a wall. A global movement of the sensor is then calculated, which is broken down for each image row. The correction is made by rearranging the image rows. The disadvantage of this is that a global motion model is necessary to correct the sensor recording.

Furthermore, a method for correcting a sensor recording is known from Synchronization and rolling shutter compensation for consumer video camera arrays by Derek Bradley et al. in 2009 IEEE Computer Society Conference on Computer Vision and Pattern Recognition Workshops, pages 1-8, 2009, which corrects the sensor recording using flow vectors of a dense optical flow. The disadvantage of this is that the flow vectors depend very strongly on the sensor's intrinsic, for example on a projection property of a lens of the sensor.

A correction of a sensor recording based on vanishing lines is known from Rolling shutter correction in manhattan world by Pulak Purkait et al. in Proceedings of the IEEE International Conference on Computer Vision, pages 882-890, 2017. The disadvantage of this is that the correction based on vanishing lines can only be used in special scenes, in particular in an environment with many straight lines.

A bundle block adjustment method is known from Rolling shutter bundle adjustment by Johan Hedborg et al. in 2012 IEEE Conference on Computer Vision and Pattern Recognition, pages 1434-1441. IEEE, 2012. In this method, the motion of the sensor and the environment are reconstructed simultaneously. The disadvantage of this is that such methods are extremely resource-intensive and thus cannot be used in real time.

In the context of the present technical teaching, an image represents an object of the real world as at least one pixel on an image plane of a sensor.

In the context of the present technical teaching, a correspondence is a vector, in particular a displacement vector in an image plane of the sensor. Furthermore, in known image processing systems, image-based correspondences in particular are determined and/or taken into account.

SUMMARY

The computer-implemented method described herein has the advantage that the correction of the at least one correspondence is carried out without knowledge of depth information and/or depth values. Furthermore, the method is less computationally intensive than an image warping method based on depth values. Furthermore, the method advantageously does not assume a static world. In this context, a projection center is assigned to the sensor and a first sensor recording is started by means of the sensor at a first instant of time. At a second instant of time, which is temporally subsequent to the first instant of time, a second sensor recording is started by means of the sensor. In the first sensor recording, a first image of at least one object in the real world is determined on an image plane of the sensor. In addition, in the second sensor recording, a second image of the at least one object on the image plane of the sensor, assigned to the first image, is determined. Subsequently, the at least one correspondence is determined as a vector from the first image to the second image. Thereafter, an angular velocity of the at least one object relative to the projection center is determined at least as a function of the first instant of time, the second instant of time and the at least one correspondence. Furthermore, the at least one correspondence is rotated about the projection center for its correction as a function of the determined angular velocity. In particular, it is provided that the first instant of time and the second instant of time comprise a time interval of 1 ms to 2000 ms with respect to each other. Alternatively or additionally, it is provided that sensor recordings are created by means of the sensor at a frequency of 0.5 Hz to 1000 Hz, wherein the first sensor recording and the second sensor recording immediately follow each other in time. This means that the correction of the at least one correspondence is advantageously independent of a predetermined displacement of the sensor and/or the object—in particular in contrast to a structure-from-motion-based method, in which a predetermined spatial distance between the first sensor recording and the second sensor recording is necessary. This means that the method can be carried out in real time.

It is particularly preferred that the at least one correspondence is rotated along a curve running through the first image and the second image on an imaginary spherical surface around the projection center for its correction as a function of the determined angular velocity. Advantageously, the rotation of the at least one correspondence is specified in more detail so that the rotation is unambiguous. In particular, for the correction of the at least one correspondence, the at least one correspondence is projected onto the imaginary spherical surface. Alternatively or additionally, the first sensor recording and/or the second sensor recording is/are projected onto the imaginary spherical surface. Advantageously, the first sensor recording and/or the second sensor recording is corrected by means of an interpolation and/or extrapolation over a curve defined on the basis of the at least one correspondence.

According to a further development of the disclosure, it is provided that a great circle of the imaginary spherical surface is selected as the curve running through the first image and the second image. Advantageously, the great circle of the imaginary spherical surface running through the first image and the second image can be determined quickly and easily. Furthermore, a great circle can be uniquely assigned to each pair of images.

It is particularly preferred that a first view ray angle be determined between a first view ray from the projection center to the first image and a second view ray from the projection center to the second image. Furthermore, a first recording instant of time of the first image, which is temporally subsequent to the first instant of time, and a second recording instant of time of the second image, which is temporally subsequent to the second instant of time, are determined. Subsequently, the angular velocity is determined at least as a function of the first view ray angle, the first recording instant of time and the second recording instant of time. In particular, the first recording instant of time and the second recording instant of time indicate the exact instants at which the respective image is created, so that the angular velocity for the correction of the at least one correspondence is advantageously determined exactly and reliably. When view rays are considered, the projection properties of the sensor are automatically factored out, whereby the method can advantageously be carried out independently of the sensor actually used and the sensor intrinsic.

According to a preferred embodiment of the disclosure, it is provided that at least one first correction angle is determined as a function of the angular velocity, the first instant of time and the first recording instant of time. In addition, a second correction angle is determined at least as a function of the angular velocity, the second instant of time and the second recording instant of time. The first image is shifted by the first correction angle in order to correct the at least one correspondence. In addition, the second image is shifted by the second correction angle to correct the at least one correspondence. Advantageously, a distorted representation of the object in the first sensor recording and the second sensor recording is corrected and/or eliminated by rotating the first image in the first sensor recording and rotating the second image in the second sensor recording. In particular, a position of the first image in the image plane of the first sensor recording and a position of the second image in the image plane of the second sensor recording are changed. The first image is particularly preferably shifted along the curve, in particular the great circle. Alternatively or additionally, the second image is shifted along the curve, in particular the great circle. In particular, for the correction of the at least one correspondence, it is assumed that the image area lies on an imaginary spherical surface, wherein the projection center is the center of the imaginary spherical surface. For the correction of the at least one correspondence, the first view ray is rotated by the first correction angle along the great circle, whereby the first image is shifted in the image plane. In addition, to correct the at least one correspondence, the second view ray is rotated by the second correction angle along the great circle, whereby the second image is shifted in the image plane.

Preferably, it is provided that, at least in dependence on the at least one correspondence and the angular velocity, all pixels of the first sensor recording are shifted in the image plane. Alternatively or additionally, at least in dependence on the at least one correspondence and the angular velocity, all pixels of the second sensor recording are shifted in the image plane. Advantageously, a distortion of the first sensor recording and/or the second sensor recording is corrected and/or eliminated by the shifting of the pixels in the first sensor recording and/or the pixels in the second sensor recording. In particular, the positions of the pixels in the image plane are changed. It is particularly preferred that all pixels of the first sensor recording be shifted in the image plane at least in dependence on the at least one correspondence and the first correction angle, wherein in particular the curve, in particular the great circle, indicates a direction of rotation. Alternatively or additionally, all pixels of the second sensor recording are shifted in the image plane at least as a function of the at least one correspondence and the second correction angle, wherein in particular the curve, in particular the great circle, indicates the direction of rotation. In particular, it is assumed for the correction of the sensor recordings that the image area lies on an imaginary spherical surface, wherein the projection center is the center of the imaginary spherical surface. For the correction of the sensor recording, the view rays from the projection center to the pixels of the sensor recording are shifted by the correction angle in the direction of the direction of rotation, whereby all pixels in the image plane are shifted.

In a further particularly preferred embodiment, each pixel of the first sensor recording is assigned a correspondence and each pixel is shifted in the image plane at least as a function of the assigned correspondence and the angular velocity. Alternatively or additionally, each pixel of the second sensor recording is assigned a correspondence and each pixel is shifted in the image plane at least as a function of the assigned correspondence and the angular velocity.

Particularly preferably, a depth calculation is corrected at least as a function of the at least one shifted correspondence. Advantageously, the depth calculation is corrected in a simple and fast manner using the at least one shifted correspondence. In particular, the depth calculation is corrected by shifting a calculated depth around the projection center.

According to a particularly preferred further development of the disclosure, it is provided that a third sensor recording is started by means of the sensor at a third instant of time that follows the second instant of time. In the third sensor recording, a third image of the at least one object, associated with the first image and the second image, is determined. In addition, at least one follow-up correspondence is determined as a vector from the second image to the third image. Subsequently, at least in dependence on the second instant of time, the third instant of time and the at least one follow-up correspondence, a follow-up angular velocity of the at least one object relative to the sensor is determined. A spline running through the first image, the second image and the third image is determined as the curve. The at least one follow-up correspondence is rotated along the spline on the imaginary spherical surface for its correction, at least as a function of the follow-up angular velocity. It is particularly preferred that the at least one correspondence along the spline on the imaginary spherical surface is also rotated at least as a function of the angular velocity. Advantageously, a correction of the at least one correspondence and/or the at least one follow-up correspondence is more accurate on the basis of the plurality of instants of time, since, in particular, a non-linear movement of the sensor and/or the object can also be mapped. In particular, it is assumed for the correction of the at least one follow-up correspondence that the image area lies on the imaginary spherical surface. For the correction of the at least one follow-up correspondence, a view ray is rotated from the projection center to the at least one follow-up correspondence as a function of the follow-up angular velocity along the spline, whereby the at least one follow-up correspondence is rotated in the image plane. In a preferred embodiment, a third correction angle is determined at least as a function of the follow-up angle velocity, the third instant of time and a third recording instant of time of the third image. The third image is rotated along the spline by the third correction angle to correct the at least one follow-up correspondence. In a configuration, the second correction angle is determined at least as a function of the follow-up angular velocity, the second instant of time and the second recording instant of time.

The at least one corrected, in particular rotated, correspondence is used with particular preference in an image evaluation method, in particular an object detection method. The image evaluation method advantageously provides better and more reliable results in the case of sensor recordings with the at least one corrected correspondence, since the sensor recording does not contain any distortions.

The control unit according to the disclosure is specially prepared to execute the computer-implemented method according to the disclosure when used as intended. In connection with the control unit, the advantages already explained in connection with the computer-implemented method for the correction of at least one correspondence arise in particular.

The motor vehicle according to the disclosure comprises a sensor, in particular a rolling shutter sensor, and the control unit according to the disclosure. In connection with the motor vehicle, there are in particular the advantages that have already been explained in connection with the computer-implemented method for the correction of at least one correspondence and the control unit.

BRIEF DESCRIPTION OF THE DRAWINGS

Further advantages and preferred features and combinations of features arise in particular from the description above and from the claims. The disclosure will be explained in more detail in the following on the basis of the drawings. Here.

DETAILED DESCRIPTION

Figure 1:
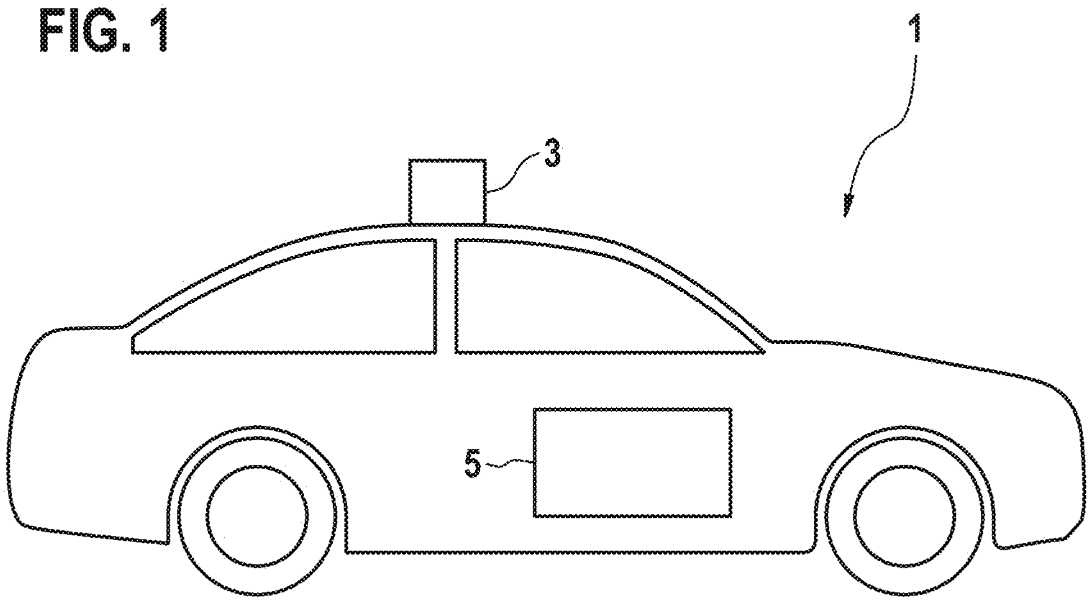
FIG. 1 shows a schematic representation of an embodiment of the motor vehicle.

FIG. 1 shows a schematic representation of an embodiment of a motor vehicle 1 having a sensor 3, in particular a rolling shutter sensor, and a control unit 5. The control unit 5 is operatively connected to the sensor 5 in a manner not explicitly shown and is adapted to control it. Furthermore, the control unit 5 is specially prepared to execute a method for the correction of at least one correspondence of row- and/or column-wise sensor recordings 7 of the sensor 3 when used as intended. A preferred embodiment of the method is explained in more detail in FIG. 2.

Figure 2:
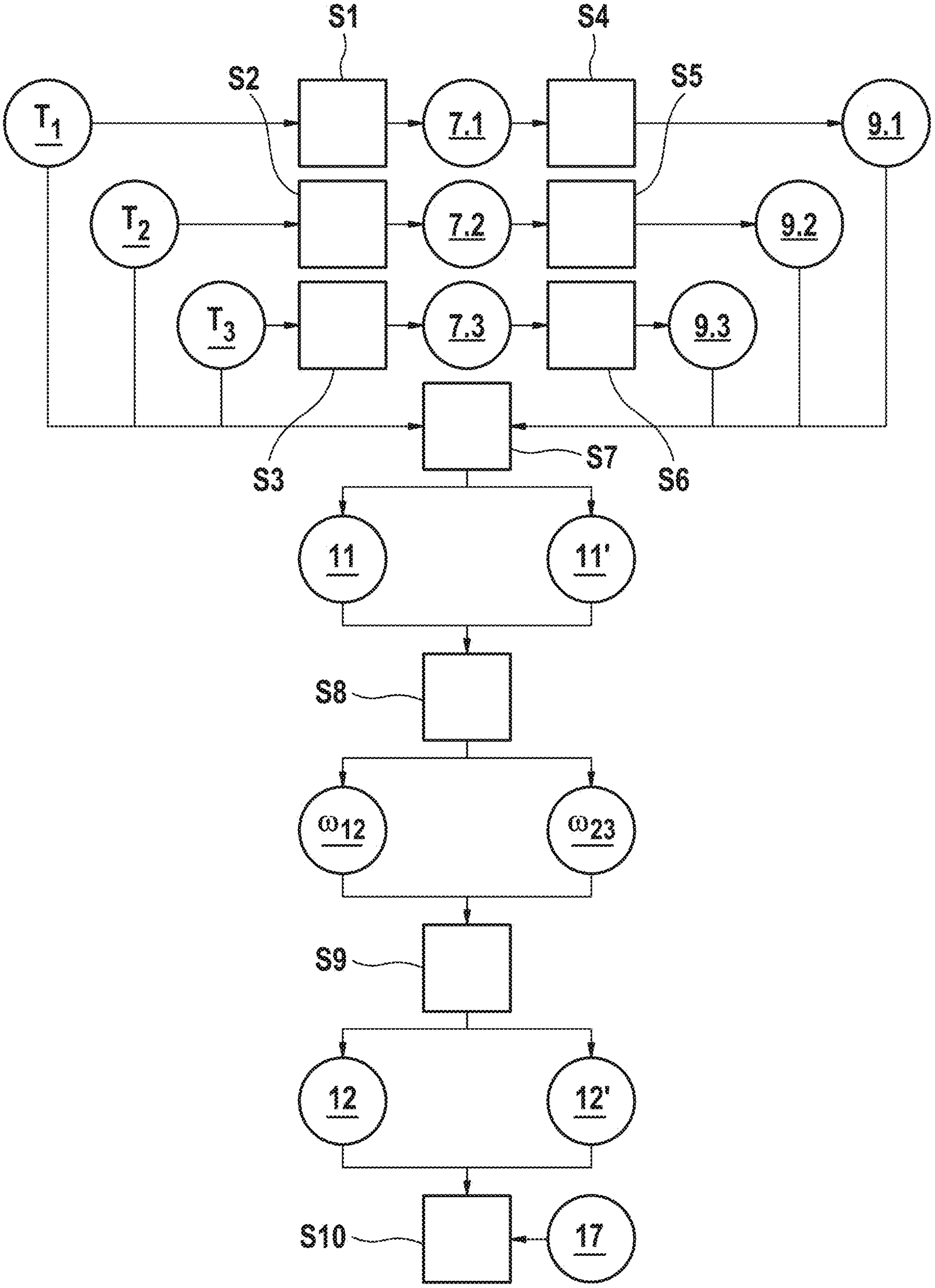
FIG. 2 shows a flow diagram an embodiment of a computer-implemented method for correcting at least one correspondence.

FIG. 2 shows a flow diagram of a first embodiment of a computer-implemented method for the correction of at least one correspondence 11 of a row- and/or column-wise sensor recording 7 of the sensor 3. In this case, a projection center 4 is assigned to the sensor 3.

Identical and functionally identical elements are provided with the same reference signs in all figures, so that reference is made to the preceding description.

In a step S1, a first sensor recording 7.1 is started by means of the sensor 3 at a first instant of time $T_1$. Due to the rolling shutter of the sensor 3, the individual image rows of the first sensor recording 7.1 are exposed one after the other, in particular with a row-by-row exposure delay dt as a time interval. Therefore, the n-th image row of the first sensor recording 7.1 is created at the instant of time $T_1+n\cdot dt$.

In a step S2, a second sensor recording 7.2 is started by means of sensor 3 at a second instant of time $T_2$ that follows the first instant of time $T_1$. Due to the rolling shutter of sensor 3, the individual image rows of the second sensor recording 7.2 are exposed one after the other, in particular with the row-by-row exposure delay dt as the time interval. Therefore, the n-th image row of the second sensor recording 7.2 is created at the instant of time $T_2+n\cdot dt$.

In an optional step S3, a third sensor recording 7.3 is started by means of sensor 3 at a third instant of time $T_3$ that follows the second instant of time $T_2$. Due to the rolling shutter of sensor 3, the individual image rows of the third sensor recording 7.3 are exposed one after the other, in particular with the row-by-row exposure delay dt as the time interval. Therefore, the n-th image row of the third sensor recording 7.3 is created at the instant of time $T_3+n\cdot dt$.

The first instant of time $T_1$ and the second instant of time $T_2$ and/or the second instant of time $T_2$ and the third instant of time $T_3$ are particularly preferably comprised in a time interval of 1 ms to 2000 ms. Alternatively or additionally, it is provided that sensor recordings 7 are created by means of the sensor 3 at a frequency of 0.5 Hz to 1000 Hz, wherein the first sensor recording 7.1 and the second sensor recording 7.2 and/or the second sensor recording 7.2 and the third sensor recording 7.3 immediately follow one another in time.

In a step S4, a first image 9.1 is determined in the first sensor recording 7.1. In particular, the first image 9.1 is imaged in the $n_1$-th row of the first sensor recording 7.1. Thus, the object is imaged in the first sensor recording 7.1 at the instant of time $T_1+n_1\cdot dt$ at which the first image 9.1 is obtained. In particular, a plurality of first images 9.1 are determined in step S4, preferably one for each pixel of the first sensor recording 7.1.

In a step S5, a second image 9.2 is determined in the second sensor recording 7.2. In particular, the second image 9.2 is imaged in the $n_2$-th row of the second sensor recording 7.2. Thus, the object is imaged in the second sensor recording 7.2 at the instant of time $T_2+n_2 \cdot dt$ at which the second image 9.2 is obtained. In particular, a plurality of second images 9.2 are determined in step S5, preferably one for each pixel of the second sensor recording 7.2, wherein a first image 9.1 is assigned to each second image 9.2.

In an optional step S6, a third image 9.3 is determined in the third sensor recording 7.3. In particular, the third image 9.3 is imaged in the $n_3$-th row of the third sensor recording 7.3. Thus, the object is imaged in the third sensor recording 7.3 at the instant of time $T_3+n_3 \cdot dt$ at which the third image 9.3 is obtained. In particular, a plurality of third images 9.3 are determined in the optional step S6, preferably one for each pixel of the third sensor recording 7.3, wherein a second image 9.2 is assigned to each third image 9.3.

In a step S7, a correspondence 11 is determined as a vector from the first image 9.1 to the second image 9.2. Optionally, in the step S7, a follow-up correspondence 11' is determined as a vector from the second image 9.2 to the third image 9.3.

In a step S8, an angular velocity $\omega_{12}$ of the at least one object is determined as a function of the first instant of time $T_1$, the second instant of time $T_2$ and the correspondence 11. Optionally, in the step S8, a follow-up angular velocity $\omega_{23}$ of the at least one object is determined as a function of the second instant of time $T_2$, the third instant of time $T_3$ and the follow-up correspondence 11'. In particular, if a plurality of correspondences 11 has been determined, a plurality of angular velocities $\omega_{12}$ is determined. Optionally, if a plurality of follow-up correspondences 11' has been determined, a plurality of follow-up angular velocities $\omega_{23}$ is determined.

In a preferred configuration of step S8, a first view ray angle $\omega_{12}$ between a first view ray 21.1 from the projection center 4 to the first image 9.1 and a second view ray 21.2 from the projection center 4 to the second image 9.2 is determined. Subsequently, the angular velocity $\omega_{12}$ is determined at least as a function of the first view ray angle $\omega_{12}$, the first recording instant of time $t_1$ and the second recording instant of time $t_2$. Optionally, a second view ray angle $\omega_{23}$ is determined between the second view ray 21.2 and a third view ray 21.3 from the projection center 4 to the third image 9.3. Subsequently, the follow-up angular velocity $\omega_{23}$ is determined at least as a function of the second view ray angle $\omega_{23}$, the second recording instant of time $t_2$ and the third recording instant of time $t_3$.

In a step S9, the correspondence 11 is rotated about the projection center 4 for its correction as a function of the determined angular velocity $\omega_{12}$. In particular, if a plurality of correspondences 11 and a plurality of angular velocities $\omega_{12}$ have been determined, each correspondence 11 of the plurality of correspondences 11 is rotated about the projection center 4 for its correction as a function of the associated determined angular velocity $\omega_{12}$ of the plurality of angular velocities $\omega_{12}$. In particular, at least the correspondence 11 and the angular velocity $\omega_{12}$ are used to displace all the pixels of the first sensor recording 7.1 in the image plane. Alternatively or additionally, at least the correspondence 11 and the angular velocity $\omega_{12}$ are used to displace all the pixels of the second sensor recording 7.2 in the image plane. Alternatively, at least as a function of the follow-up correspondence 11' and the follow-up angular velocity $\omega_{23}$, all pixels of the second sensor recording 7.2 are shifted in the image plane. Optionally, at least as a function of the follow-up correspondence 11' and the follow-up angular velocity $\omega_{23}$, all pixels of the third sensor recording 7.3 are shifted in the image plane.

In particular, each pixel of the plurality of pixels of the first sensor recording 7.1 is shifted at least as a function of a correspondence 11 assigned to the pixel and the angular velocity $\omega_{12}$ in the image plane. Alternatively or additionally, each pixel of the plurality of pixels of the second sensor recording 7.2 is shifted at least as a function of a correspondence 11 assigned to the pixel and the angular velocity $\omega_{12}$ in the image plane. Alternatively or additionally, each pixel of the plurality of pixels of the second sensor recording 7.2 is shifted at least as a function of a follow-up correspondence 11' assigned to the pixel and the follow-up angular velocity $\omega_{23}$ in the image plane. Alternatively or additionally, each pixel of the plurality of pixels of the third sensor recording 7.3 is shifted at least as a function of a follow-up correspondence 11' associated to the pixel and the follow-up angular velocity $\omega_{23}$ in the image plane.

Optionally, in the step S9, the follow-up correspondence 11' is rotated about the projection center 4 for its correction as a function of the determined follow-up angular velocity $\omega_{23}$. In particular, if a plurality of follow-up correspondences 11' and a plurality of follow-up angular velocities $\omega_{23}$ have been determined, each follow-up correspondence 11' of the plurality of follow-up correspondences 11' is rotated about the projection center 4 for its correction as a function of the associated determined follow-up angular velocity $\omega_{23}$ of the plurality of follow-up angular velocities $\omega_{23}$.

Preferably, in step S9, the correspondence 11 and/or follow-up correspondence 11' as a function of the determined angular velocity $\omega_{12}$ and/or the determined follow-up angular velocity $\omega_{23}$ along a curve running through the first image 9.1 and the second image 9.2 and/or along a curve running through the second image 9.2 and the third image 9.3 on an imaginary spherical surface around the projection center 4 for its correction. In particular, the curve is a great circle of the imaginary spherical surface through two images 9 or a spline on the imaginary spherical surface through all three images 9.

In a further preferred configuration, a first correction angle $\Omega_1$ is determined in the step S9 at least as a function of the angular velocity $\omega_{12}$, the first instant of time $T_1$ and the first recording instant of time $t_1$. Furthermore, a second correction angle $\Omega_2$ is determined at least as a function of the angular velocity $\omega_{12}$, the second instant of time $T_2$ and the second recording instant of time $t_2$. Alternatively, a second correction angle $\Omega_2$ is determined at least as a function of the follow-up angular velocity $\omega_{23}$, the second instant of time $T_2$ and the second recording instant of time $t_2$. Optionally, a third correction angle $\Omega_3$ is determined at least as a function of the follow-up angular velocity $\omega_{23}$, the third instant of time $T_3$ and the third recording instant of time $t_3$. In particular, the first image 9.1 is shifted by the first correction angle $\Omega_1$, in particular along the curve, preferably the great circle or the spline. Alternatively or additionally, the second image 9.2 is shifted by the second correction angle $\Omega_2$, in particular along the curve, preferably the great circle or the spline. Alternatively or additionally, the third image 9.3 is shifted by the third correction angle $\Omega_3$, in particular along the curve, preferably the great circle or the spline.

In a configuration of step S9, the correction of the at least one correspondence 11 and/or the at least one follow-up correspondence 11' is additionally carried out at least as a function of a dense optical flow. A flow map is determined by storing the at least one correspondence 11 and/or the at least one follow-up correspondence 11' as at least one flow vector in a two-dimensional representation. In this process, an end point of the at least one correspondence 11 and/or the at least one follow-up correspondence 11' is stored in the flow map. The end point in the flow map is then corrected by changing the associated flow vector. A correction of the start point of the at least one correspondence 11 and/or of the at least one follow-up correspondence 11' is stored in an additional map, wherein a start point displacement vector is stored for the respective flow vector. Subsequently, the at least one correspondence 11 and/or the at least one follow-up correspondence 11' can be corrected at least as a function of the corrected flow map and the additional map.

In an optional step S10, the corrected, in particular rotated, correspondence 12 is used in an image evaluation method, in particular an object detection method. Alternatively or additionally, the corrected, in particular rotated, follow-up correspondence 12' is used in the image evaluation method, in particular the object detection method.

Alternatively or additionally, in the optional step S10, at least as a function of the corrected correspondence 12, a depth calculation 17 that is already present and is known in particular from a structure-from-motion-based method is corrected, in that in particular a calculated depth is shifted around the projection center 4. Alternatively or additionally, at least as a function of the corrected follow-up correspondence 12', the already existing depth calculation 17, which is known in particular from a structure-from-motion-based method, is corrected by shifting a calculated depth around the projection center 4.

Figure 3:
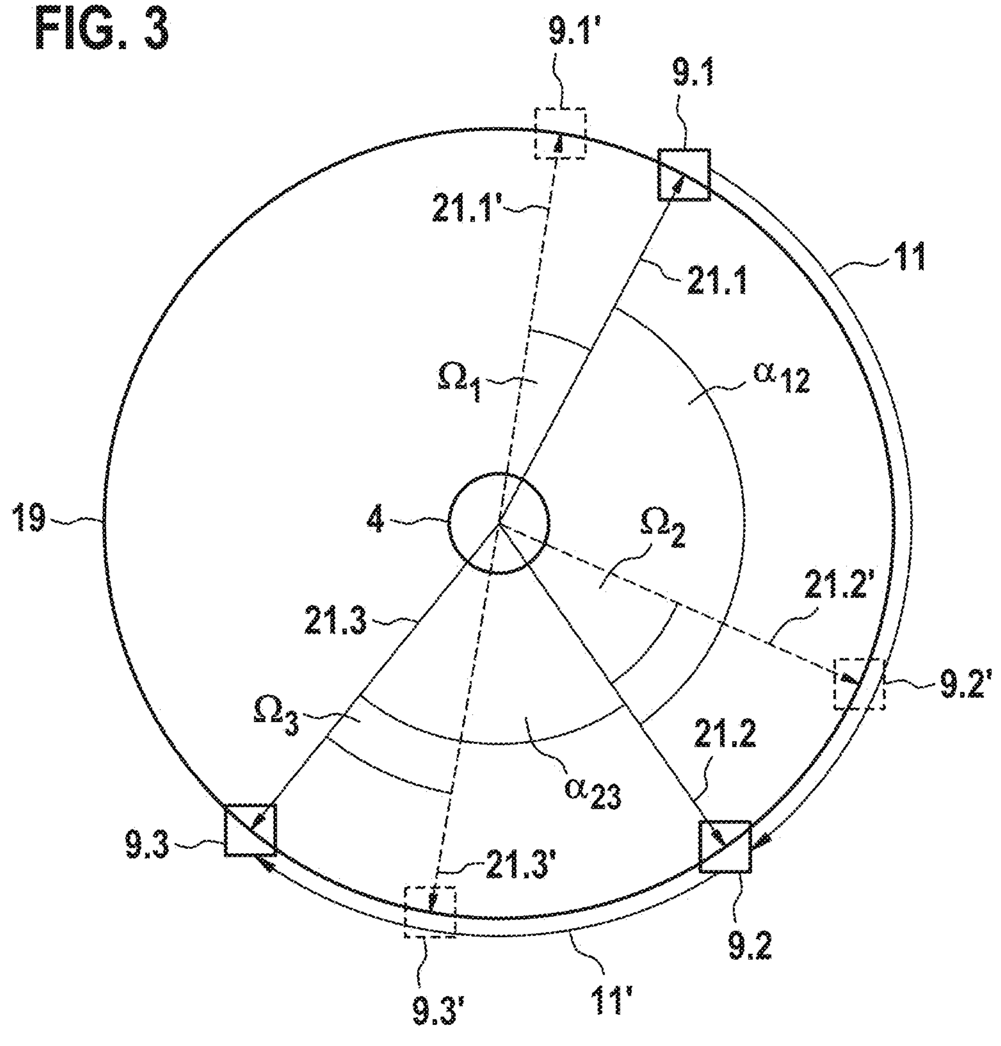
FIG. 3 shows a graphical determination of correction angles, and FIG. 4 a schematic representation of an epipolar plane with a correspondence and a follow-up correspondence.

FIG. 3 shows a graphical determination of the correction angles Li.

The projection center 4 of the sensor 3 and an epipolar plane 19 are shown as a circle around the projection center 4. The projection center 4 and the correspondences 11 form the epipolar plane 19. The correction angles 2; result from the angular velocity $\omega_{12}$ of the correspondence 11 around the projection center 4 in the epipolar plane 19.

The first image 9.1 is captured at the instant of time $T_1+n_1\cdot dt$. Furthermore, the second image 9.2 is captured at the instant of time $T_2+n_2\cdot dt$ and the third image 9.3 is captured at the instant of time $T_3+n_3\cdot dt$. The real-world object depicted by the images 9 moves in the period from $T_1+n_1\cdot dt$ to $T_2+n_2\cdot dt$ and in the period from $T_2+2\cdot dt$ to $T_3+3\cdot dt$ in the real world relative to the projection center 4—and thus also in the epipolar plane 19, represented by the correspondence 11 and the follow-up correspondence 11'. Therefore, the first image 9.1, the second image 9.2 and the third image 9.3 are located at different positions in the epipolar plane 19. This movement is particularly characterized by a first view ray angle $\omega_{12}$ between a first view ray 21.1 from the projection center 4 to the first image 9.1 and a second view ray 21.2 from the projection center 4 to the second image 9.2. This results in particular in an angular velocity $\omega_{12}$ of the object using the following equation.

$$\omega_{12} = \frac{\alpha_{12}}{T_2 - T_1 + (n_2 - n_1)\cdot dt}$$

The angular velocity $\omega_{12}$ of the object is now used to displace the first image 9.1 in the epipolar plane 19. In this process, an initial first view ray 21.1' from the projection center 4 to a shifted first image 9.1'—in particular, the shifted first image 9.1' maps an initial position of the object at the first instant of time $T_1$ in the image plane—and the first view ray 21.1 enclose the first correction angle $\Omega_1$, wherein the equation $$\Omega_1 = \omega_{12}\cdot n_1\cdot dt = \frac{\alpha_{12}\cdot n_1\cdot dt}{T_2 - T_1 + (n_2 - n_1)\cdot dt}$$

applies. In addition, an initial second view ray 21.2' from the projection center 4 to a shifted second image 9.2'—in particular, the shifted second image 9.2' maps an initial position of the object at the second instant of time $T_2$ in the image plane—and the second view ray 21.2 enclose a second correction angle $\Omega_2$, wherein the equation $$\Omega_2 = \omega_{12}\cdot n_2\cdot dt = \frac{\alpha_{12}\cdot n_2\cdot dt}{T_2 - T_1 + (n_2 - n_1)\cdot dt}$$

applies. Alternatively, the second correction angle $\Omega_2$ is calculated on the basis of a second view ray angle $\omega_{23}$—the angle between the second view ray 21.2 from the projection center 4 to the second image 9.2 and a third view ray 21.3 from the projection center 4 to the third image 9.3—using the following equation.

$$\Omega_2 = \omega_{23}\cdot n_2\cdot dt = \frac{\alpha_{23}\cdot n_2\cdot dt}{T_3 - T_2 + (n_3 - n_2)\cdot dt}$$

In this case, the follow-up angular velocity $\omega_{23}$ of the object is determined by means of the following equation.

$$\omega_{23} = \frac{\alpha_{23}}{T_3 - T_2 + (n_3 - n_2)\cdot dt}$$

Furthermore, a third correction angle $\Omega_3$ is preferably calculated as a third image 9.3, wherein the equation $$\Omega_3 = \omega_{23}\cdot n_3\cdot dt = \frac{\alpha_{23}\cdot n_3\cdot dt}{T_3 - T_2 + (n_3 - n_2)\cdot dt}$$

is used to calculate the third correction angle $\Omega_3$. In this process, an initial third view ray 21.3' from the projection center 4 to a shifted third image 9.3'—in particular, the shifted third image 9.3' maps an initial position of the object at the third instant of time $T_3$ in the image plane—and the third view ray 21.3 enclose the third correction angle $\Omega_3$.

Figure 4:
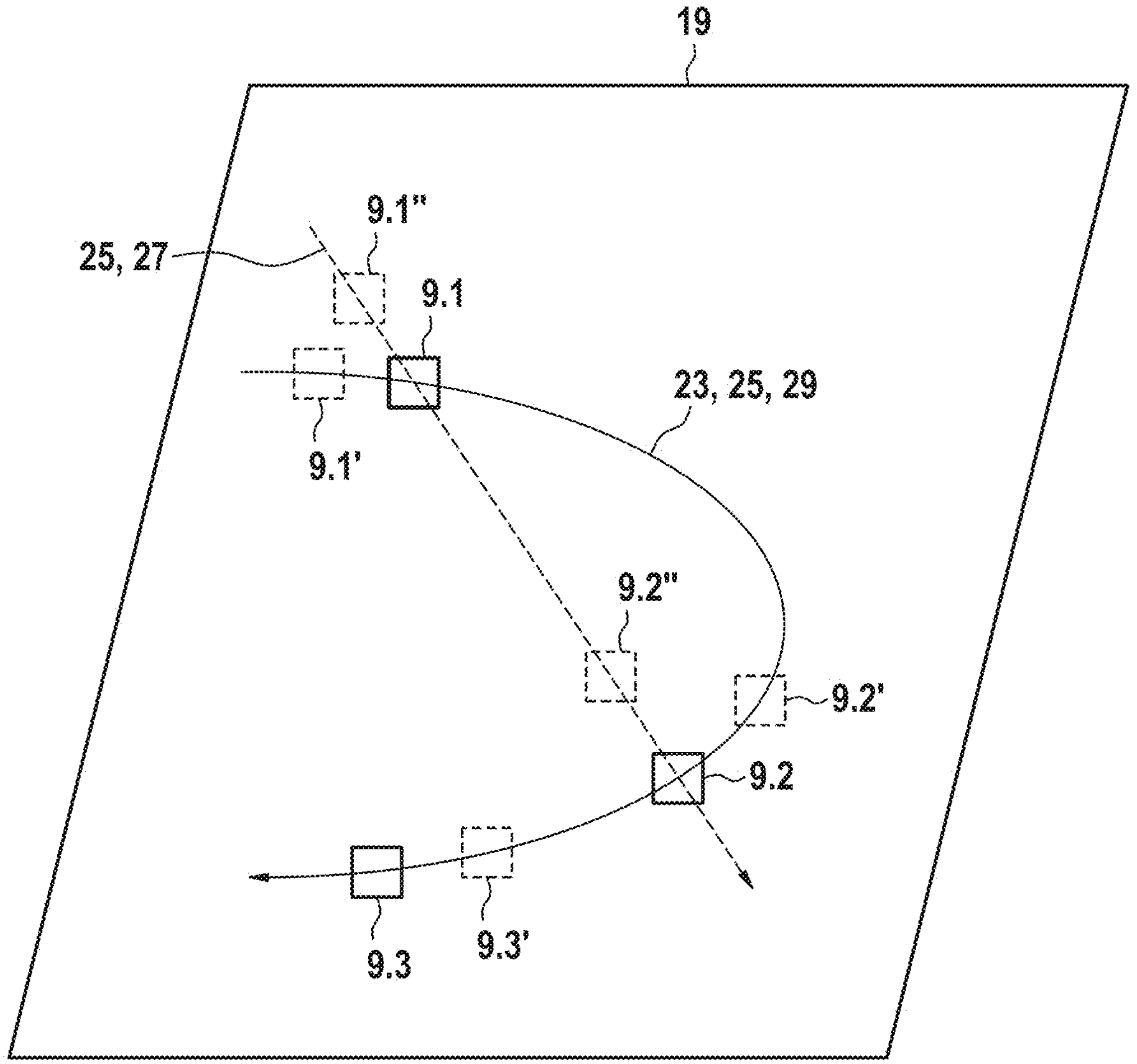

FIG. 4 shows a schematic representation of the epipolar plane 19 with the images 9.

Analogous to FIG. 3, the first image 9.1 is captured at the instant of time $T_1+n_1\cdot dt$, the second image 9.2 at the instant of time $T_2+n_2\cdot dt$ and the third image 9.3 at the instant of time $T_3+n_3\cdot dt$. The object in the real world, which is imaged by means of the images 9, moves in the period from $T_1+n_1\cdot dt$ to $T_2+n_2\cdot dt$ and in the period from $T_2+n_2\cdot dt$ to $T_3+n_3\cdot dt$ in the real world relative to the sensor—and thus also in the epipolar plane 19, represented by a trajectory of movement 23 of the object. Therefore, the first image 9.1, the second image 9.2 and the third image 9.3 are at different positions in the epipolar plane 19.

For the correction of the sensor recordings 7, the shifted first image 9.1', the shifted second image 9.2' and the shifted third image 9.3' are determined. To do this, the view rays 21 from the sensor 3 to the respective image 9 are rotated by the correction angle $\Omega_i$ along a connecting line 25 between the first image 9.1 and the second image 9.2.

If only two images 9 are used—in this case the first image 9.1 and the second image 9.2—only one connecting straight line 27 can be determined as the connecting line 25. Thus, when the view rays 21 are rotated along the connecting straight line 27, a linearly shifted first image 9.1" and a linearly shifted second image 9.2" are obtained.

If three FIG. 9 are used—in this case the first FIG. 9.1, the second FIG. 9.2 and the third FIG. 9.3—a spline 29 can be determined as a connecting line 25. This means that when the view rays 21 are rotated along the spline 29, the shifted first image 9.1', the shifted second image 9.2' and the shifted third image 9.3' are obtained.

It can be clearly seen that the movement of the object in the epipolar plane 19 can be better interpolated by means of the spline 29 than by means of the connecting straight line 27. Therefore, the linearly shifted images 9.1", 9.2" also deviate from the actual trajectory of movement 23 of the object.

What is claimed is:

1. A computer-implemented method for correction of at least one correspondence of row-wise and/or column-wise sensor recordings of a sensor, the method comprising:

assigning a projection center to the sensor;

starting, at a first instant of time, a first sensor recording using the sensor;

starting, at a second instant of time, temporally subsequent to the first instant of time, a second sensor recording using the sensor;

determining a first image of at least one object of a real world on an image plane of the sensor in the first sensor recording;

determining a second image, associated with the first image, of the at least one object on the image plane of the sensor in the second sensor recording; and determining the at least one correspondence as a vector from the first image to the second image, wherein an angular velocity of the at least one object relative to the projection center is determined at least as a function of the first instant of time, the second instant of time, and the at least one correspondence, and wherein the at least one correspondence is corrected by rotating the at least one correspondence about the projection center as a function of the determined angular velocity.

2. The method according to claim 1, further comprising:

rotating the at least one correspondence along a curve running through the first image and the second image on an imaginary spherical surface around the projection center for correction of the at least one correspondence as a function of the determined angular velocity.

3. The method according to claim 2, further comprising:

choosing a great circle of the imaginary spherical surface as the curve running through the first image and the second image.

4. The method according to claim 3, further comprising:

determining a first correction angle at least as a function of the angular velocity, the first instant of time, and the first recording instant of time;

determining a second correction angle at least as a function of the angular velocity, the second instant of time, and the second recording instant of time;

rotating the first image on the great circle by the first correction angle; and rotating the second image on the great circle by the second correction angle.

5. The method according to claim 2, further comprising:

starting, at a third instant of time, temporally subsequent to the second instant of time, a third sensor recording using the sensor;

determining a third image, associated with the first image and the second image, of the at least one object in the third sensor recording;

determining at least one follow-up correspondence as a vector from the second image to the third image;

determining a follow-up angular velocity of the at least one object relative to the sensor at least as a function of the second instant of time, the third instant of time, and the at least one follow-up correspondence;

a spline running through the first image, the second image, and the third image is determined as the curve; and rotating the at least one follow-up correspondence at least as a function of the follow-up angular velocity along the spline on the imaginary spherical surface for correcting the at least one follow-up correspondence.

6. The method according to claim 1, further comprising:

determining a first view ray angle between a first view ray from the projection center to the first image and a second view ray from the projection center to the second image;

determining a first recording instant of time, temporally subsequent to the first instant of time, of the first image and a second recording instant of time, temporally subsequent to the second instant of time, of the second image; and determining the angular velocity at least as a function of the first view ray angle, the first recording instant of time, and the second recording instant of time.

7. The method according to claim 1, further comprising:

shifting, at least as a function of the correspondence and the angular velocity, all pixels of the first sensor recording in the image plane; and/or shifting, at least as a function of the correspondence and the angular velocity, all pixels of the second sensor recording in the image plane.

8. The method according to claim 1, further comprising:

assigning each pixel of the first sensor recording a correspondence, and shifting each pixel in the image plane at least as a function of the assigned correspondence and the angular velocity; and/or assigning each pixel of the second sensor recording a correspondence, and shifting each pixel in the image plane at least as a function of the assigned correspondence and the angular velocity.

9. The method according to claim 8, further comprising:

correcting a depth calculation at least as a function of the shifted correspondence by rotating a calculated depth around the projection center.

10. The method according to claim 1, further comprising:

using the corrected correspondence in an image evaluation method.

11. The method according to claim 10, wherein the image evaluation method is an object detection method.

12. The method according to claim 1, wherein the sensor is a rolling shutter sensor.

13. A control unit configured to execute the method according to claim 1.

14. A motor vehicle, comprising:

a sensor; and the control unit according to claim 13.

15. The motor vehicle according to claim 14, wherein the sensor is a rolling shutter sensor.

* * * * *